United States Patent
Likander et al.

(10) Patent No.: US 11,525,022 B2
(45) Date of Patent: Dec. 13, 2022

(54) METHOD FOR DEWATERING OF BIOLOGICAL SLUDGE USING A POLYMERIC FLOCCULANT

(71) Applicant: Kemira Oyj, Helsinki (FI)

(72) Inventors: Joonas Likander, Espoo (FI); Rosa Carceller, Espoo (FI)

(73) Assignee: Kemira Oyj, Helsinki (FI)

( * ) Notice: Subject to any disclaimer, the term of this patent is extended or adjusted under 35 U.S.C. 154(b) by 119 days.

(21) Appl. No.: 16/762,150

(22) PCT Filed: Dec. 14, 2018

(86) PCT No.: PCT/FI2018/050923
§ 371 (c)(1),
(2) Date: May 7, 2020

(87) PCT Pub. No.: WO2019/115883
PCT Pub. Date: Jun. 20, 2019

(65) Prior Publication Data
US 2020/0361805 A1    Nov. 19, 2020

(30) Foreign Application Priority Data

Dec. 15, 2017 (FI) .................................. 20176124

(51) Int. Cl.
| | |
|---|---|
| *C08F 265/10* | (2006.01) |
| *C02F 1/56* | (2006.01) |
| *C02F 11/147* | (2019.01) |
| *C08L 33/26* | (2006.01) |
| *C02F 103/32* | (2006.01) |

(52) U.S. Cl.
CPC ............. *C08F 265/10* (2013.01); *C02F 1/56* (2013.01); *C02F 11/147* (2019.01); *C08L 33/26* (2013.01); *C02F 2103/32* (2013.01); *C08L 2312/00* (2013.01)

(58) Field of Classification Search
None
See application file for complete search history.

(56) References Cited

U.S. PATENT DOCUMENTS

| | | |
|---|---|---|
| 5,707,534 A | 1/1998 | Del Corral et al. |
| 2002/0165307 A1 | 11/2002 | Huang et al. |
| 2005/0230319 A1* | 10/2005 | Mori .................. C08F 290/062 210/732 |
| 2017/0226696 A1 | 8/2017 | Bierganns et al. |

FOREIGN PATENT DOCUMENTS

| | | | | |
|---|---|---|---|---|
| CN | 1868911 A | 11/2006 | | |
| EP | 0819651 A1 | 1/1998 | | |
| EP | 1845066 A1 | 10/2007 | | |
| JP | 2003041136 A | 2/2003 | | |
| JP | 2013078755 A | 5/2013 | | |
| WO | 9831748 A1 | 7/1998 | | |
| WO | 2004041884 A1 | 5/2004 | | |
| WO | 2005095291 A1 | 10/2005 | | |
| WO | WO-2005095291 A1 * | 10/2005 | ......... | B01D 21/2461 |
| WO | WO-2013060280 A1 * | 5/2013 | ............... | C02F 1/56 |
| WO | 2016030407 A | 3/2016 | | |
| WO | WO-2016030407 A1 * | 3/2016 | .......... | D21H 17/375 |
| WO | 2016079383 A1 | 5/2016 | | |

OTHER PUBLICATIONS

Butler et al. ("Sewage Parameters: BOD", 2013, accessed online https://www.butlerms.com/sewage-parameters-1-bod/ on Oct. 29, 2021, pp. 1-4). (Year: 2013).*
Finnish Patent Office, Search report of FI20176124, dated Jun. 20, 2018, 2 pages.
Search report of corresponding application CN20181214, dated Feb. 25, 2022, 2 pages.

* cited by examiner

*Primary Examiner* — Clare M Perrin
(74) *Attorney, Agent, or Firm* — Meunier Carlin & Curfman LLC

(57) ABSTRACT

A method for dewatering of biological sludge is disclosed. The method includes addition of a flocculant to a biological sludge, which includes an aqueous phase and a suspended solid organic material, flocculating and dewatering the sludge. The flocculant includes a polymer composition, which includes a cationic crosslinked first polymer, which is selected from crosslinked polyamines, and a cationic second polymer, which is a polymer obtained by polymerization of (meth)acrylamide and cationic monomers, the second cationic polymer being polymerized in presence of the cationic first polymer.

16 Claims, No Drawings

METHOD FOR DEWATERING OF BIOLOGICAL SLUDGE USING A POLYMERIC FLOCCULANT

PRIORITY

This application is a U.S. national application of the international application number PCT/FI2018/050923 filed on Dec. 14, 2018 and claiming priority of Finnish application 20176124 filed on Dec. 15, 2017 the contents of all of which are incorporated herein by reference.

FIELD OF INVENTION

The present invention relates to a method for dewatering of biological sludge according to preambles of the enclosed independent claim.

BACKGROUND

Municipal and industrial wastewaters as well as sewage are treated in biological sludge process, where microorganisms degrade organic material and remove nutrients present in the wastewater to produce effluent with high-quality effluent. Biological sludge contains mass of aerobic bacteria and other aquatic organisms, which are suspended and mixed with wastewater in an aerated tank. Excess sludge is removed from the process for post-treatment of sludge. Typically, large quantities of wet sludge are formed, which must be dewatered before it can be disposed. Dewatering can be done by using gravity, filtering, pressing or centrifugal force. The sludge is exposed to various forces, e.g. high shear forces, during the dewatering and other post-treatment steps.

Biological sludges are often difficult to dewater. Sludges may be conditioned before dewatering by addition of chemicals, such as inorganic compounds of iron and lime, or organic compounds, such as polymer coagulants and flocculants. The chemicals are added to improve the sludge handling, to coagulate and/or flocculate the suspended matter into larger agglomerates and to increase dewatering effect. When the biological sludge is flocculated by using chemical addition, the formed flocs should resist various forces, e.g. shear forces, without breaking of the floc. This would ensure that high quality water phase with low turbidity is obtained from the dewatering step and that the solids content of the sludge is high after dewatering.

There is a need for new effective flocculants that can be used for dewatering of biological sludge from wastewater purification, especially purification of municipal or agricultural wastewater or wastewater from food or beverage manufacture.

SUMMARY OF INVENTION

An object of this invention is to minimise or even eliminate the disadvantages existing in the prior art.

An object is also to provide a polymer composition which provides an effective dewatering of biological sludge.

A further object of this invention is to provide a polymer composition which is provides improved sludge performance during dewatering, especially under high-shear conditions.

These objects are attained with the invention having the characteristics presented below in the characterising parts of the independent claims. Some preferable embodiments are disclosed in the dependent claims.

The features recited in the dependent claims and the embodiments in the description are mutually freely combinable unless otherwise explicitly stated.

The exemplary embodiments presented in this text and their advantages relate by applicable parts to all aspects of the invention, even though this is not always separately mentioned.

A typical method according to the invention for dewatering of biological sludge, comprises
  adding a flocculant to a biological sludge, which comprises an aqueous phase and suspended solid organic material, and flocculating the sludge,
  dewatering the sludge,
wherein the flocculant comprises a polymer composition, which comprises
  a cationic crosslinked first polymer, which is selected from crosslinked polyamines, and
  a cationic second polymer, which is a copolymer obtained by polymerisation of (meth)acrylamide and at least one cationic monomer, the second cationic polymer being polymerised in presence of the cationic first polymer.

DETAILED DESCRIPTION OF THE INVENTION

Now it has been surprisingly found out that clear improvements in dewatering of biological sludge are obtained when the flocculant comprises a polymer composition, which is obtained by polymerising a second polymer in the presence of a first polymer. The first polymer thus acts as a host polymer and as a polymerisation medium for the second polymer. The polymer composition formed from a combination of crosslinked polyamine and cationic copolymer of (meth)acrylamide and cationic monomer provides the flocculant with properties, with which an improved dewatering rate, filtrate quality, shear resistance and dry solids content can be achieved for the sludge. It is speculated that the polymer composition is able to interact with the solid constituents of the sludge in a manner that generates more robust flocs and enhances the dewatering performance. Furthermore, the flocculant comprising the defined polymer composition tolerates well process variations.

In the present context the term "biological sludge" denotes a sludge originating from a biological treatment process of wastewater and/or sewage. Biological sludge comprises an aqueous phase and suspended solid organic material, and it is typically rich in material of bacterial origin as well as other aquatic organisms. The biological sludge may have a biological oxygen demand (BOD)>50 mg/l, and/or a dry solids content in the range of 5-80 g/l, preferably 10-40 g/l. According to one preferable embodiment of the present invention the biological sludge to be dewatered originates from a process treating municipal or agricultural wastewater. The biological sludge may thus be municipal wastewater sludge or agricultural sludge. Alternatively, the biological sludge may originate from an industrial process, especially from wastewater treatment or from food or beverage production or from food or beverage processing.

Dewatering of biological sludge comprises an addition of a flocculant to the biological sludge for flocculating the sludge before the dewatering of the sludge. Preferably the flocculant is added immediately before the dewatering. According to one embodiment the flocculant is added 30 s, preferably 20 s, more preferably 15 s before start of the dewatering. The flocculant can be added directly to a pipeline or the like where the sludge is transported to the dewatering. Dewatering of the sludge may be performed by using mechanical dewatering means, such as centrifuge(s), belt press or chamber press, preferably centrifuge(s).

The flocculant comprises a polymer composition, which comprises a cationic crosslinked first polymer, which is selected from crosslinked polyamines. During the production of the polymer composition the first polymer functions as a polymerisation medium for the second polymer, i.e. the monomers of the second polymer are added to a polymer solution of the first polymer and polymerisation of the second polymer is conducted in the presence of the first polymer. This results in physical three-dimensional entanglement of the polymer chains of the first and second polymer. The first and second polymers become inseparable from each other without breaking of the polymer chains, i.e. the polymer chains of the first polymer and the second polymer are physically entangled and inseparably entangled in during the polymerisation of the second polymer. Preferably there is, however, no chemical bonds between the first polymer and the second polymer, but their chains are inseparably intertwined. The first polymer is preferably free of reactive polymerizable groups, such as double carbon-carbon bonds, in its structure. In a preferable embodiment the monomers of the second polymer, when polymerised in the presence of the first polymer, are reacting with each other and not forming covalent bonds with the first polymer, which is present as polymerisation medium. Thus, the first polymer is preferably present essentially only as polymerisation medium. Covalent bonds between the first and the second polymer are not requisite for providing the three-dimensional structure to the polymer composition, as the first and second polymer are physically entangled, and their polymer chains are inseparably intertwined or interlaced with each other.

The first polymer and the second polymer are fully miscible and compatible with each other. The obtained polymer composition is not in form of an emulsion or dispersion. This means that the obtained polymer composition does not contain two or more phases of different polymers. The polymer composition is also preferably free from polymer particles comprising mostly (>40%) of only one polymer. The polymer composition is water-soluble.

The first polymer is crosslinked polyamine, which according to one embodiment of the invention may be selected from a group comprising crosslinked copolymers of epichlorohydrin and dimethylamine; copolymers of epichlorohydrin, dimethylamine and ethylenediamine; polyamidoamines; and polyvinylamine. Preferably the first polymer is crosslinked copolymer of epichlorohydrin, dimethylamine and ethylenediamine.

The first polymer may have a weight average molecular weight at least 10 000 g/mol, preferably in the range of 10 000-350 000 g/mol, more preferably 30 000-275 000 g/mol, even more preferably 50 000-250 000 g/mol. According to one embodiment of the invention the first polymer may have a weight average molecular weight in the range of 120 000-350 000 g/mol, preferably 125 000-275 000 g/mol, more preferably 135 000-250 000 g/mol. The first polymer preferably has a molecular weight, which has been observed to improve the performance of the polymer composition and its flocculation ability.

The first polymer may be obtained by condensation polymerisation.

According to one embodiment of the invention the polymer composition may comprise at least 1 weight-%, preferably 1-30 weight-%, more preferably 3-20 weight-% even more preferably 5-15 weight-%, of the first polymer, calculated from the total dry polymeric material weight of the composition. The amount of first polymer provides suitable viscosity, when it acts as polymerisation medium for the second polymer while simultaneously providing an efficient interaction with the constituents of the biological sludge and good flocculation and dewatering ability.

The polymer composition, which is used as flocculant, comprises further a cationic second polymer, which is a copolymer obtained by polymerisation of (meth)acrylamide and at least one cationic monomer. The second cationic polymer is polymerised in presence of the cationic first polymer. The polymerisation medium for the second polymer thus comprises an aqueous, preferably particle-free, solution of the first polymer. The polymerisation medium preferably is free from any oil phase. The polymerisation medium does not comprise high concentration of any inorganic salt, either. Typically, the amount of inorganic salt is less than 5 weight-%, preferably less than 2.5 weight-%, more preferably less than 1.5 weight-%. It has been observed that the second polymer improves the robustness of the formed flocs.

The second polymer is obtained by free radical polymerisation. For example, the second polymer may be obtained by gel polymerisation, e.g. by adiabatic gel polymerisation. It is possible to obtain a polymer composition having a higher polymer content by gel polymerisation, which makes the composition more cost efficient in view of the logistics. A high polymer content has the additional benefit of improved microbial stability.

The polymer composition may preferably be in form of a dry powder or particulate material or particulate product, and it is dissolved into the water and diluted to desired appropriate feed concentration before its use. The obtained polymer composition may be dried and optionally milled to a suitable particle size. According to one embodiment the dry polymer composition in form of particulate product or particulate material or powder may have a solids content of at least 80 weight-%, preferably at least 85 weight-%, more preferably at least 90 weight-%. Dry particulate polymer composition is easy and cost-efficient to transport and store, it remains stable for long periods of time and is resistant towards microbiological degradation.

The cationic monomer for the second polymer may be selected from group consisting of 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC), and diallyldimethylammonium chloride (DADMAC). Preferably the cationic monomer is [2-(acryloyloxy)ethyl] trimethylammonium chloride (ADAM-Cl) or diallyldimethylammonium chloride (DADMAC). In general, for those of the listed monomers containing quaternary nitrogen in their structure, the cationicity is not pH dependent, which is a preferable feature.

According to one embodiment of the invention the second polymer may be obtained by copolymerisation of (meth) acrylamide and at least 10 mol-% of cationic monomer, preferably 10-90 mol-%, more preferably 20-70 mol-%, even more preferably 30-60 mol-%, of cationic monomer, calculated from amount of monomers used for second polymer.

According to one embodiment the second polymer is a linear polymer.

According to another preferable embodiment the second polymer may be a crosslinked copolymer. The crosslinked second polymer may be obtained by polymerising (meth) acrylamide and cationic monomers in the presence of at least one crosslinking agent. It has been observed that when the second polymer is crosslinked, the formed flocs of biological sludge are very robust, and resist well high-shear forces. Suitable crosslinking agent may be selected from methylenebisacrylamide, ethylene glycol divinyl ether, di(ethylene glycol) divinyl ether and tri-(ethylene glycol) divinyl ether. Methylenebisacrylamide is being preferred as crosslinking agent. The amount of crosslinking agent may be, for example, in the range of 0.25-100 mg/kg monomers, preferably 0.5-10 mg/kg monomers, more preferably 0.75-5 mg/kg monomers.

The polymer composition, which is used as a flocculant for the biological sludge, may have a standard viscosity SV of 3.5-5 mPas, preferably 3.8-4.8, measured at 0.1 weight-% solids content in an aqueous NaCl solution (1 M), at 25° C., using Brookfield DVII T viscometer with UL adapter.

The flocculant comprising the polymer composition may be added in amount of 1-40 kg/ton dry sludge, preferably 2-30 kg/ton dry sludge, preferably 4-20 kg/ton dry sludge, given as active polymer.

EXPERIMENTAL

Some embodiments of the invention are described in the following non-limiting examples.

Polymer Compositions Used in the Examples

Two different polymer compositions C1 and C2 were used according to invention in the following sludge dewatering Examples:

Composition C1 comprised as first polymer crosslinked polyvinylamine. The second polymer, which was polymerised in the presence of the first polymer was a copolymer of acrylamide and 30 mol-% of [2-(acryloyloxy)ethyl] trimethylammonium chloride (ADAM-Cl). The amount of first polymer was 9 weight-%, as active, based on monomers of the second polymer.

Composition C2 comprised as polymer crosslinked polyvinylamine. The second polymer, which was polymerised in the presence of the first polymer was a copolymer of acrylamide and 30 mol-% of [2-(acryloyloxy)ethyl] trimethylammonium chloride (ADAM-Cl). Methylenebisacrylamide was used as crosslinker in the polymerisation. The amount of first polymer was 9 weight-%, as active, based on monomers of the second polymer.

Methods Used in the Examples

The apparatuses and methods used in sludge dewatering examples are given in Table 1.

TABLE 1

Apparatuses and methods used in sludge dewatering examples.

| Property | Apparatus/Standard |
|---|---|
| pH | Knick Portamess 911 pH |
| Dry solids | SFS 3008 |
| Suspended solids | SFS 3008 |
| Turbidity | HACH 2100AN IS Turbidimeter//ISO 7027 |

Gravity dewaterability of sludge was tested with Polytest. The sludge samples were filtered with Polytest cylinder of 10 cm diameter using in bottom a wire cloth having air permeability of 5400 m$^3$/m$^2$h. Treads/cm was 13.0/5.9. The sludge sample amount was 200-400 g, but always identical between samples compared. Mixing of the polymer composition was done with motor stirrer in baffled mixing vessel. Mixing speed was 1000 rpm and mixing time was 10-30 seconds, but always identical between samples compared.

Sludge dry solids content after centrifugation was tested with Heraeus laboratory centrifuge. For this test, sludge sample was taken from Polytest wire after gravity dewaterability testing. Sludge sample of about 6 grams was measured to a 50 mesh plastic filter that was placed on upper part of centrifuge tube. Centrifugation time was 60 seconds and rotation rate 1000 rounds per minute (rpm). After the centrifugation, reject water was collected from bottom of the centrifuge tube and centrifuged sludge from plastic filter.

Sludge Dewatering Example 1

This example simulates dewatering of biological sludge after anaerobic digestion process in municipal wastewater treatment plant with biological phosphorus removal. Dry solids content of the biological sludge was 29 g/l before dosage of the polymer composition.

Polymer compositions were diluted to 0.1% concentration before dosing to the sludge. Dewatering rate was tested with Polytest as described above. Polymer doses were 5, 6 and 6.5 kg/ton dry sludge. Mixing time was 10 seconds. Amount of drained water was measured after 15 seconds. Turbidity was measured from the drained reject water. Results from these experiments are presented in Table 2.

TABLE 2

Results of Example 1 for drainage and reject water turbidity.

| Polymer | Dose [kg/t] | Drainage 15 s [g] | Reject water turbidity [NTU] |
|---|---|---|---|
| R1 | 5.0 | 41.4 | 290 |
| R1 | 6.0 | 54.0 | 205 |
| R1 | 6.5 | 63.0 | 181 |
| C1 | 5.0 | 53.3 | 202 |
| C1 | 6.0 | 10.8 | 105 |
| C1 | 6.5 | 97.6 | 102 |

It can be seen from the results of Table 2 that the use of polymer composition C1 according to the invention provided better performance than the reference polymer R1. Polymer composition C1 produced faster dewatering and better reject water quality than the reference polymer R1 with all the tested doses. All of these factors are important for economical sludge dewatering.

Sludge Dewatering Example 2

This example simulates centrifugation of biological sludge after anaerobic digestion process in municipal wastewater treatment plant with biological phosphorus removal. Dry solids content of the biological sludge was 29 g/l before dosage of the polymer composition.

Polymer compositions were diluted to 0.1% concentration before dosing to the sludge. Sludge dry solids after centrifugation was tested with table centrifuge as described above. Polymer doses were 5, 6 and 6.5 kg/ton dry sludge with mixing time 10 seconds and 6, 7 and 8 kg/ton dry sludge with mixing time 20 seconds. Dry solids content of the sludge was measured after 60 second centrifugation at 1000 rpm. Results from these experiments are presented in Table 3.

TABLE 3

Dry solids content results after centrifugation in Example 2.

| Polymer | Dose [kg/t] | Mixing time [s] | Dry solids [%] |
|---|---|---|---|
| R1 | 5.0 | 10 | 9.8 |
| R1 | 6.0 | 10 | 9.9 |
| R1 | 6.5 | 10 | 10.2 |
| C1 | 5.0 | 10 | 10.2 |
| C1 | 6.0 | 10 | 10.6 |
| C1 | 6.5 | 10 | 10.7 |
| R1 | 6.0 | 20 | 9.2 |
| R1 | 7.0 | 20 | 9.6 |
| R1 | 8.0 | 20 | 10.6 |
| C1 | 6.0 | 20 | 9.4 |
| C1 | 7.0 | 20 | 10.4 |
| C1 | 8.0 | 20 | 10.8 |

It can be seen for results of Table 3 that the use of polymer composition C1 according to the invention provided better performance than the reference polymer R1. Polymer composition C1 produced higher dry solids content after centrifugation with 10 second and 20 second mixing than the reference polymer R1 with all the tested doses. Changing the mixing time from 10 seconds to 20 seconds represents increasing share forces which is required for efficient centrifugation. All of these factors are important for economical dewatering of biological sludge.

Sludge Dewatering Example 3

This example simulates dewatering of biological sludge after anaerobic digestion process in municipal wastewater treatment plant with chemical phosphorus removal. Dry solids content of the sludge was 25 g/l before dosage of the polymer composition.

Polymer compositions were diluted to 0.1% concentration before dosing to the sludge. Dewatering rate was tested with Polytest as described above. Polymer doses were 7, 8 and 9 kg/ton dry sludge with mixing time 10 seconds and 9, 10 and 11 kg/ton dry sludge with mixing time 30 seconds. Amount of drained water was measured after 10 seconds. Turbidity was measured from the drained reject water. Results are presented in Table 4.

TABLE 4

Results for drainage and reject water turbidity in Example 4.

| Polymer | Dose [kg/t] | Mixing time [s] | Drainage 10 s [g] | Reject water turbidity [NTU] |
|---|---|---|---|---|
| R1 | 7.0 | 10 | 95.6 | 396 |
| R1 | 8.0 | 10 | 125.2 | 301 |
| R1 | 9.0 | 10 | 118.3 | 391 |
| C2 | 7.0 | 10 | 93.9 | 345 |
| C2 | 8.0 | 10 | 136.7 | 349 |
| C2 | 9.0 | 10 | 130.1 | 286 |
| R1 | 9.0 | 30 | 64.4 | 490 |
| R1 | 10.0 | 30 | 77.9 | 452 |
| R1 | 11.0 | 30 | 127.1 | 275 |
| C2 | 9.0 | 30 | 84.4 | 382 |
| C2 | 10.0 | 30 | 128.7 | 293 |
| C2 | 11.0 | 30 | 133.8 | 259 |

It can be seen from the results of Table 4 that the use of polymer composition C2 according to the invention provided better performance than the reference polymer R1. Polymer composition C2 produced faster dewatering and better reject water quality than the reference polymer R1. Polymer composition C2 did also have much better shear resistance, which was seen in the experiments with longer mixing time causing more shear forces to the flocs. All of these factors are important for economical sludge dewatering.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for dewatering of a biological sludge, comprising:
   adding a flocculant to the biological sludge, which sludge is municipal wastewater sludge or agricultural sludge, and comprises an aqueous phase and a suspended solid organic material, flocculating the sludge, and
   dewatering the sludge,
   wherein
   the flocculant comprises a polymer composition, which comprises:
   5-15 weight-% of a cationic crosslinked first polymer, which is crosslinked polyvinylamines, and
   a cationic second polymer, which is a copolymer obtained by polymerization of (meth)acrylamide and 30-60 mol-% of at least one cationic monomer calculated from amount of monomers used for the second cationic polymer, the second cationic polymer being polymerized in presence of the cationic first polymer.

2. The method according to claim 1, wherein the first polymer and the second polymer are miscible with each other.

3. The method according to claim 1, wherein the polymer chains of the first polymer and second polymer are physically and inseparably entangled in during the polymerization of the second polymer.

4. The method according to claim 1, wherein the first polymer has a weight average molecular weight in a range of 10 000-350 000 g/mol.

5. The method according to claim 4, wherein the first polymer has a weight average molecular weight in a range of 125 000-275 000 g/mol.

6. The method according to claim 5, wherein the first polymer has a weight average molecular weight in a range of 135 000-250 000 g/mol.

7. The method according to claim 4, wherein the first polymer has a weight average molecular weight in a range of 30 000-275 000 g/mol.

8. The method according to claim 7, wherein the first polymer has a weight average molecular weight in a range 50 000-250 000 g/mol.

9. The method according to claim 1, wherein the cationic monomer for the second polymer is selected from group consisting of 2-(dimethylamino)ethyl acrylate (ADAM), [2-(acryloyloxy)ethyl] trimethylammonium chloride (ADAM-Cl), 2-(dimethylamino)ethyl acrylate benzylchloride, 2-(dimethylamino)ethyl acrylate dimethylsulphate, 2-dimethylaminoethyl methacrylate (MADAM), [2-(methacryloyloxy)ethyl] trimethylammonium chloride (MADAM-Cl), 2-dimethylaminoethyl methacrylate dimethylsulphate, [3-(acryloylamino)propyl] trimethylammonium chloride (APTAC), [3-(methacryloylamino)propyl] trimethylammonium chloride (MAPTAC) and diallyldimethylammonium chloride (DADMAC).

10. The method according to claim 1, wherein the second polymer is a crosslinked polymer, obtained by polymerizing (meth)acrylamide and cationic monomers in the presence of at least one crosslinking agent.

11. The method according to claim 10, wherein the amount of crosslinking agent is in a range of 0.25-100 mg/kg monomers.

12. The method according to claim 1, wherein the second polymer is a linear polymer.

13. The method according to claim 1, wherein the polymer composition has a standard viscosity SV of 3.5-5 mPas measured at 0.1 weight-% solids content in an aqueous NaCl solution (1 M), at 25° C., using Brookfield DVII T viscometer with UL adapter.

14. The method according to claim 1, wherein the flocculant comprising the polymer composition is added in amount of 1-40 kg/ton dry sludge.

15. The method according to claim 1, wherein the biological sludge has a biological oxygen demand (BOD)>50 mg/l and/or a dry solids content in the range of 5-80 g/l.

16. The method according to claim 1, wherein the polymer composition has a standard viscosity SV of 3.8-4.8, measured at 0.1 weight-% solids content in an aqueous NaCl solution (1 M), at 25° C., using Brookfield DVII T viscometer with UL adapter.

* * * * *